(No Model.) 2 Sheets—Sheet 1.
W. A. BRICE.
PHOTOGRAPHIC CAMERA.
No. 422,709. Patented Mar. 4, 1890.
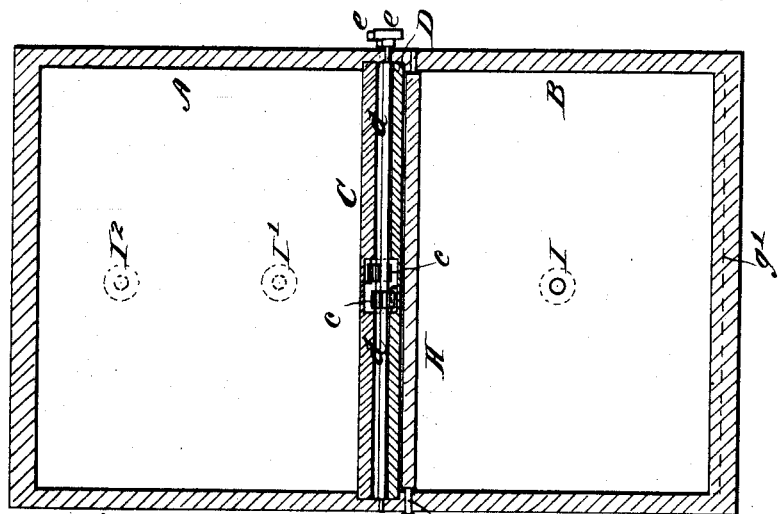
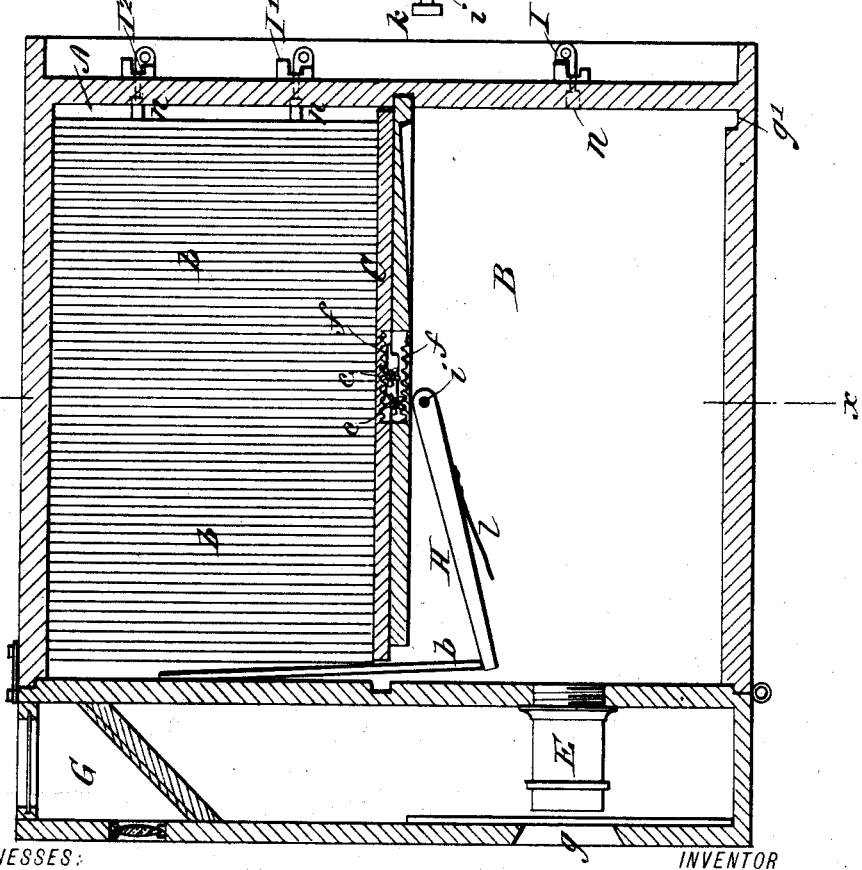
WITNESSES:
Donn Twitchell
C. Sedgwick
INVENTOR
W. A. Brice
BY Munn & Co.
ATTORNEY (No Model.)
W. A. BRICE.
PHOTOGRAPHIC CAMERA.
No. 422,709.
2 Sheets—Sheet 2.
Patented Mar. 4, 1890.
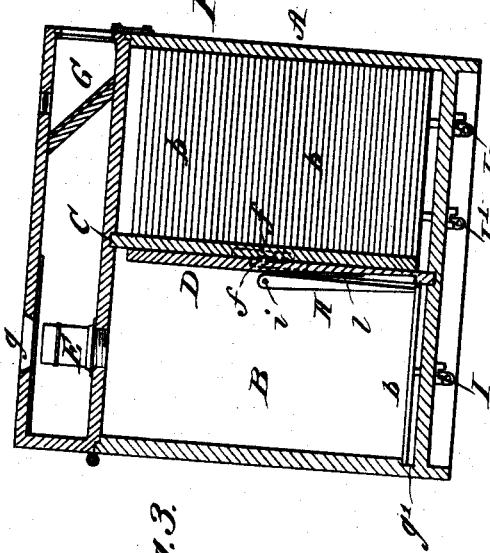
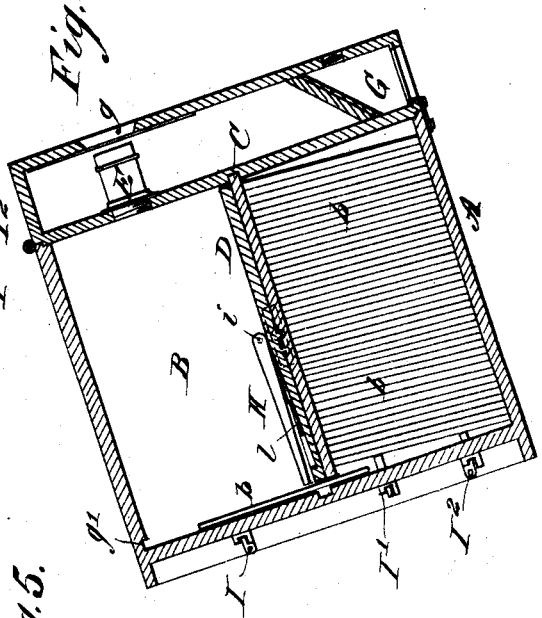
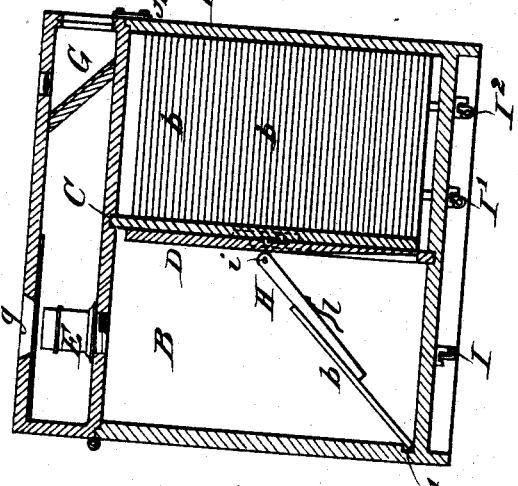
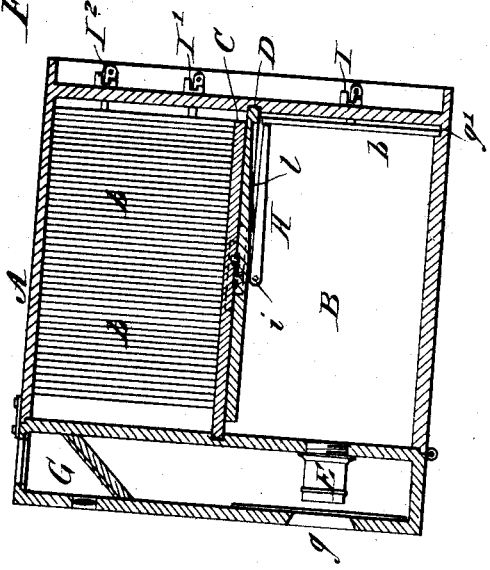
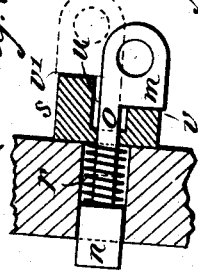
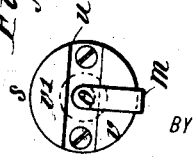
WITNESSES:
Donn Fintchell
C. Sedgwick
INVENTOR
W. A. Brice
BY
Munn &Co.
ATTORNEY
N. PETERS, Photo-Lithographer, Washington, D. C.

UNITED STATES PATENT OFFICE.

WILLIAM A. BRICE, OF LONDON, ENGLAND.

PHOTOGRAPHIC CAMERA.

SPECIFICATION forming part of Letters Patent No. 422,709, dated March 4, 1890.

Application filed April 11, 1889. Serial No. 306,823. (No model.) Patented in England March 17, 1888, No. 4,149.

*To all whom it may concern:*

Be it known that I, WILLIAM A. BRICE, of London, England, have invented new and useful Improvements in Photographic Cameras, (patented in Great Britain March 17, 1888, No. 4,149,) of which the following is a full, clear, and exact description.

This invention relates to photographic cameras which are provided with a compartment for holding a series of sensitive plates, films, or sheets for use in succession within the exposing-chamber of the camera.

The invention consists in a camera of this description of novel construction, a conspicuous characteristic feature of which is that the successive transfer of the sensitive plates or sheets from the storage-chamber to the exposing-chamber and transfer of each negative taken back again to the storage-chamber is effected mainly by gravity and the manipulation of the camera-box about an imaginary axis, aided by the adjustment from the exterior, without opening the camera, of certain interior devices that control the passage of the sensitive plates or sheets from either one of said chambers to the other and the placing of the plate or film to be photographed in a proper exposing position, substantially as hereinafter described, and pointed out in the claims.

This improved camera, which may be made in any suitable style and of any desired finish, with various accessories not necessary here to mention or illustrate, may be provided with any suitable shutter that will serve to take either instantaneous or time pictures, or both. From the rapid and easy manner, however, in which the camera may be operated without opening it to take a series of pictures in succession, and the fact that it does not have or need not have any loose parts or separate devices, excepting its stand, where one is used, said camera will be found well adapted for detective purposes, but of course is equally applicable to other uses.

In the accompanying drawings and following description only so much of the camera will be found illustrated and referred to as is necessary to explain the invention.

Reference is to be had to the accompanying drawings, forming a part of this specification, in which similar letters of reference indicate corresponding parts in all the figures.

Figure 1 represents a longitudinal sectional elevation of a camera in part embodying my invention, and showing the instrument in position at the commencement of its passage of a sensitive plate from the storage-chamber to the exposing-compartment. Fig. 2 is a vertical transverse section of the same upon the line $x\ x$ in Fig. 1. Figs. 3, 4, 5, and 6 are vertical sectional elevations showing successively the instrument in different positions to transfer the sensitive plate or sheet into its exposing position to secure or hold it there and after the picture is taken to transfer it back to the storage-chamber. Fig. 7 is a partly-sectional longitudinal view of one of a series of spring-stops used in the instrument, and Fig. 8 an end view of the same.

The camera-box is constructed with two chambers A B, arranged one above the other, and the one A of which is a storage-compartment for a series of sensitive plates $b$ in sufficient number to fill it, while the other compartment B forms the exposing-chamber. These two compartments are separated from each other by two thin partitions C D, the one immediately under the other, and both of a width to extend across the whole width of the box and fitted to slide at their side edges in grooves in the sides of the box, as shown in Fig. 2; but said slides or sliding partitions are each of a less length than said compartments, but only to a limited extent, to admit of a single plate passing freely past their ends from the storage-chamber to the exposing-chamber and back again, as hereinafter described. This movement of the slides C D may be effected separately and in opposite directions by pinions $c\ c$ on rods $d\ d$, extending through to the outside of the camera and operated by buttons $e\ e$, said pinion gearing with racks $f\ f$ on the slides C D. Any other means for operating these slides or sliding partitions, however, may be used—as, for example, the well-known lozenge or parallelogram working by sliding in a similar opening, thus producing by the pushing out or in of a straight friction-rod the parallel up or down motion required.

E indicates the lens-tube of the camera, and

*g* its exposing-opening, which may be provided with any suitable shutter adapted to take instantaneous or time pictures, or either, and G is a finder of any suitable construction. Focusing devices of any proper kind may be provided.

H is a guiding movable plane for the plates, sensitive films, cards, or sheets from the storage-chamber to the exposing-chamber, and which also acts as an abutment to hold the exposed plate in position. This movable plane, or, as we shall term it, carrier "H," is pivoted, as at *i*, within the exposing-chamber beneath the bottom sliding partition D, and acts when transferring the plate in the capacity of an inclined plane. The same is or may be operated from the exterior of the camera by an extension of its pivot or rod *i*, through a knob or button *k*, on the outer end of the latter; or it may be operated by any other suitable means. Upon the back of this carrier H is a spring *l*, and this carrier placed about midway in the exposing-chamber prevents all possibility of the plate accidentally being turned over.

I $I'$ $I^2$ are spring-stops in the rear end of the camera-chambers A B, capable of operation from the exterior thereof, and the uses of which will be hereinafter described. These spring-stops may be of any suitable construction; but they are here shown as made of a shouldered head *m*, front end enlarged portion *n*, and intermediate shank *o*, around which is a spiral spring *r*, arranged between the portion *n* and a box *s* on the back of the camera, provided with a slot *u*, on either side of which the box *s* is made to project different distances, as shown at *v v'*, so that on turning the shouldered head *m*, with its attached shank, said head may rest upon either portion *v v'* of the box, or within and against the bottom of the slot *u* by the action of the spring *r*. The exposing-chamber need only have one of these spring-stops I; but the storage-chamber should be provided with two of them $I'$ $I^2$, arranged one above the other.

In the operation of the apparatus, supposing the camera to be in the position represented in Fig. 1 and the movable partitions C and D to be drawn back, as there represented, then the front sensitive plate in the storage-chamber A will drop and pass out from the latter through the opening in front of the top partition C onto the pivoted carrier or apron H. To bring the plates into their proper position to insure the front one freely dropping, as described, the camera may first be turned about an imaginary axis—say from right to left—to cause the pile of plates in the storage-chamber to descend toward the front of the instrument. As the front one of these plates falls by gravity onto the carrier or apron H, which had previously been raised by the knob *k*, or otherwise, from the outside, the turning of the camera about an imaginary axis horizontal and crosswise of the instrument is continued or repeated, the box being held in the hands for the purpose, during which only one plate has time to fall through into the exposing-chamber B onto the carrier H, when or after which the partition C is closed, as represented in Fig. 3, and the pivoted carrier or inclined plane H is lowered by manipulation from the exterior. The plate to be exposed then lies flat upon the carrier H, its film surface uppermost. From the position shown in Fig. 3 the camera-box is further turned till its lens points to the zenith, as represented in Fig. 4, and the carrier H, which conducts the plate by an easy sliding motion down the back end of the exposing-chamber into position for exposure, is further turned into a rear vertical position, the spring *l* being compressed by contact with the partition D to allow of the plate sliding off the carrier; but to effect this delivery of the plate the spring-stud I at the rear end of the exposing-chamber is first drawn back and turned so that its shouldered head *m* in Fig. 7 is made to rest upon the raised portion *v* of the box *s*. This insures the plate lying flat, as required, and the free end of the pivoted carrier H then passes over the one edge of the plate, the opposite edge of the plate having previously glided under an abutment formed by a groove *g'* in the opposite side of the box. The carrier H, pressed forward by its spring *l*, also acts as an abutment over the other edge of the plate, all as shown in Fig. 4. The spring-stud I is then released by turning it to allow of its shouldered head *m* resting within the slot *u* of the box *s*, when said stud will forcibly hold the plate up against its abutments. The abutments formed by the groove *g'* might also be made adjustable, if desired, to obtain the effect known in photography of a "swing-back adjustment." The plate to be exposed is now or by these means held immovable parallel to the back of the box and in accurate register of focus, no matter what the thickness of the plate. The camera may then be further revolved or turned to take the picture to the position shown in Fig. 5. After exposure the pile of plates *b* in the storage-chamber A is partially raised at one end by adjustment of the spring-stud $I'$, bringing its shouldered head *m*, Fig. 7, into the notch *u* of the box *s*, while the spring-stud $I^2$ is adjusted to only partially project by its shouldered head *m* resting upon the portion *v* of the box *s* within the storage-chamber, as shown in Fig. 6. This makes room for the return of the plate upon which the image has been taken back of the pile of plates in the storage-chamber without exposing its delicate sensitive surface to being scratched or marred. The way now being prepared for such return of said plate, the movable partition D is raised just enough to allow said plate to freely pass it, and the whole camera-box is turned into an inclined position, as shown in Fig. 6, and the spring-stud $I'$ of the exposing chamber partially drawn back and locked. The exposed plate will then fall by gravity as far as the inner projecting end of the stud I' will permit. Said stud I' is then drawn fully back and locked; but the stud I² is adjusted partially inward, as shown in Fig. 6, and made to press upon the lower portion of the pile of plates to relieve the entering exposed plate from the pressure of the pile. The exposed plate then falls onto the projecting inner end part of the stud I², which in its turn is afterward drawn back and locked to allow of the entering plate completing its fall to the back or bottom of the pile, the camera being slightly further turned to aid this and prevent the pile of plates from coming back on the entering plate till the latter has fully reached its place in the storage-chamber. The movable partition D is then shut to exclude all access of light from the one end of the pile of plates as the partition C did from the other end thereof.

To bring another advance plate into exposing position and to take another picture, the camera is manipulated as before, and such operation may be repeated till all the reserve plates are used up.

Having thus described my invention, what I claim as new, and desire to secure by Letters Patent, is—

1. In a photographic camera provided with a storage-chamber for a pile of sensitive plates or sheets, the combination, with the exposing and storage chambers of the instrument arranged one above the other, of movable partitions dividing said chambers and adapted to open and close communication respectively at the front and rear ends of the instrument between the chambers, whereby upon suitably turning the camera-box one plate at a time may be passed by its gravity into the exposing-chamber and afterward be returned to the storage-chamber at the reverse end of the instrument, substantially as specified.

2. The combination, with the plate storage and exposing chambers of the instrument and means for passing one sensitive plate or sheet at a time by its gravity from the one chamber to the other, of a pivoted incline plane or carrier within the exposing-chamber adapted to safely conduct said plate into its exposing position within said chamber, essentially as described, such inclined plane or carrier afterward acting as an abutment, and also from its midway central position in the exposing-chamber preventing the plate from being accidentally turned over in any of the manipulations.

3. The combination, with the sensitive-plate-storage chamber A, the exposing-chamber B, and the movable partitions C D, of the pivoted plate-carrier and abutment H, for operation together and in relation with the camera-box, substantially as and for the purposes herein set forth.

4. The combination, with the camera-box having an upper plate-storage chamber A and lower exposing-chamber B, the latter of which is provided with an abutment at its back and lower end for the plate under exposure, of the movable partitions C D, opening and closing communication between the two chambers at their opposite ends, the pivoted plate-carrier H, adapted to also act as an abutment to the plate when in an exposing position, and an adjustable spring stud or stop at the back end of the exposing-chamber, essentially as and for the purposes specified.

5. The combination, with the camera-box having an upper plate-storage chamber A and lower exposing-chamber B, means for passing one sensitive plate at a time by its gravity from one chamber to the other, and the pivoted plate conductor or carrier H, of adjustable spring studs or stops at the rear end of the storage-chamber adapted to incline the pile of plates in the storage-chamber and to make a way for the passage of the exposed plate to the back of said pile, substantially as described.

WILLIAM A. BRICE.

Witnesses:
E. P. DOBRILWICH,
HILDA FAURUS.